US009644275B2

(12) United States Patent
Koo et al.

(10) Patent No.: US 9,644,275 B2
(45) Date of Patent: May 9, 2017

(54) METHOD FOR PREPARATION OF GRAPHENE USING SPONTANEOUS PROCESS

(71) Applicant: KOREA INSTITUTE OF SCIENCE AND TECHNOLOGY, Seoul (KR)

(72) Inventors: Chong Min Koo, Goyang-si (KR); Soon Man Hong, Seoul (KR); Seung Sang Hwang, Seoul (KR); Min Ho Kim, Incheon (KR); Hyun Chul Park, Seoul (KR); Jin Hong Lee, Busan (KR); Won Jun Na, Seoul (KR); Seung Gun Yu, Seoul (KR); Jang Woo Lee, Goyang-si (KR); Kyung Youl Baek, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 309 days.

(21) Appl. No.: 14/470,083

(22) Filed: Aug. 27, 2014

(65) Prior Publication Data
US 2015/0275378 A1  Oct. 1, 2015

(30) Foreign Application Priority Data
Mar. 31, 2014  (KR) ........................ 10-2014-0038134

(51) Int. Cl.
 *C25B 1/00* (2006.01)
 *C01B 31/04* (2006.01)
 *C25B 5/00* (2006.01)
(52) U.S. Cl.
 CPC ............ *C25B 1/00* (2013.01); *C01B 31/0469* (2013.01); *C25B 5/00* (2013.01)

(58) Field of Classification Search
 CPC .............................. C25B 1/00; C01B 31/0469
 See application file for complete search history.

(56) References Cited

U.S. PATENT DOCUMENTS

| 2013/0161199 A1* | 6/2013 | Li | ............................ C25B 1/00 205/341 |
| 2013/0171055 A1 | 7/2013 | He et al. | |
| 2013/0295468 A1 | 11/2013 | Yu et al. | |
| 2014/0061059 A1* | 3/2014 | Dryfe | ..................... B82Y 30/00 205/555 |

FOREIGN PATENT DOCUMENTS

| KR | 20100088667 A | 8/2010 |
| KR | 2013/0081545 A | 7/2013 |

OTHER PUBLICATIONS

Korean Notice of Allowance dated Oct. 16, 2015; Appln. No. 10-2014-0038134.

(Continued)

*Primary Examiner* — Nicholas A Smith
(74) *Attorney, Agent, or Firm* — Ladas & Parry LLP

(57) ABSTRACT

The present invention relates to a method for preparing graphene using a spontaneous process, and particularly, to a method for mass-producing high-quality graphene composed of a single layer or several layers by using lithium intercalation of a graphite electrode occurring during the process of charging a lithium ion battery and a lithium ion capacitor in the preparation of graphene to form a graphite intercalation compound, and performing exfoliation through a reaction with water (or alcohol).

19 Claims, 11 Drawing Sheets

(56) References Cited

OTHER PUBLICATIONS

Yenny Hernandez, et al; "High-yield production of graphene by liquid-phase exfoliation of graphite", Nature Nanotechnology, vol. 3, Published online: Aug. 10, 2008; pp. 563-568.
Xiaolin Li, et al; "Highly conducting graphene sheets and Langmuir-Blodgett films", Nature Nanotechnology, vol. 3, Published online: Aug. 1, 2008, pp. 538-542.
K.S. Novoselov, et al; "Electric Field Effect in Atomically Thin Carbon Films", Science, vol. 306, Oct. 22, 2004, pp. 666-669.
Xiaoyin Yang, et al; "Two-Dimensional Graphene Nanoribbons", J. Am. Chem. Soc., vol. 130, pp. 4216-4217; Published on Web Mar. 7, 2008.

\* cited by examiner

METHOD FOR PREPARATION OF GRAPHENE USING SPONTANEOUS PROCESS

CROSS-REFERENCE TO RELATED APPLICATION

Pursuant to 35 U.S.C. §119(a), this application claims the benefit of earlier filing date and right of priority to Korean Application No. 10-2014-0038134, filed on Mar. 31, 2014, the contents of which is incorporated by reference herein in its entirety.

BACKGROUND OF THE DISCLOSURE

1. Field of the Disclosure

The present disclosure relates to a method for preparing graphene using a spontaneous process, and particularly, to a method for mass-producing high-quality graphene composed of a single layer or several layers by utilizing lithium intercalation of a graphite electrode occurring during the process of charging a lithium ion battery and a lithium ion capacitor in the preparation of graphene to form a graphite intercalation compound, and performing exfoliation through a reaction with water (or alcohol).

2. Background of the Disclosure

Graphite has a layered structure in which graphene having a plate structure formed by connecting carbon atoms in a hexagonal ring and having a monoatomic thickness, is stacked, and a distance between the layers is 3.35□. Graphene has a structure in which a single-layered carbon nanotube is stretched out, and thus is a material which has high conductivity corresponding to that of carbon nanotubes, excellent mechanical properties, and a large surface area due to a high aspect ratio. Since layers of graphite are weakly bonded to each other by Van der Waals forces, many studies on the preparation of expanded graphite in which these layers are partially exfoliated, or graphene in which these layers are completely exfoliated have been conducted. Graphene has many advantages such as excellent charge mobility, low surface resistance, excellent mechanical properties, and thermal and chemical stability compared to other materials. Recently, many applied studies in which these excellent advantages of graphene are utilized have been reported. In particular, graphene is a very excellent conductor having 100 times or more charge mobility than that of silicon and is evaluated to enable electric current to flow in an amount 100 times greater than that of copper, and thus has technical and industrial application values in various fields such as an electrode material for a display and a solar cell, a channel material for transferring charges of a next-generation semiconductor device, and an additive of a conductive polymer film by utilizing these characteristics.

As a result of peeling off a graphene layer from graphite and investigating the properties thereof, it has been recently found that graphene has very useful properties which are different from those of existing materials. The most noteworthy property is that when electrons move in graphene, the electrons flow as if the mass of the electrons is zero. This means that the electrons flow at a speed at which light travels in vacuum, that is, at the speed of light. Graphene also exhibits an abnormal half-integer quantum Hall effect with respect to electrons and holes. Further, the electron mobility of graphene is as high as about 20,000 to about 50,000 $cm^2/Vs$. Above all, in the case of carbon nanotubes which are similar to graphene, since the yield is significantly decreased while carbon nanotubes are subjected to purification after synthesis, the price of a final product is too high even though the product is synthesized by using cheap materials, whereas the unit cost of preparation in the preparation of graphene using graphite as a raw material is low due to high yield after purification. In addition, in the case of single-layered carbon nanotubes, the metallic and semiconductor properties vary depending on chirality and diameter thereof, and all the band-gaps thereof are also different from each another even though the semiconductor properties are the same. Accordingly, a separation process is required for single-layered carbon nanotubes to be applied to a particular application field, but it is known that it is very difficult to perform the process. On the other hand, in the case of graphene, since the electrical properties thereof vary according to the crystal direction of graphene, a user may provide an electrical property in a direction selected by the user, and thus may usefully design a device. Such properties of graphene may be very effectively used in a carbon-based electric or electromagnetic device, and the like.

Currently, examples of a method for preparing graphene include mechanical, epitaxial, thermal expansion, gas phase, chemical vapor deposition (CVD), graphene oxidation-reduction, graphite intercalation compound (GIC) methods, and the like as follows, and the CVD method and the graphene oxidation-reduction method are generally used in the preparation of graphene.

1. Direct Exfoliation Method from Graphite

1) Mechanical Exfoliation

A mechanical exfoliation is used, in which each layer is peeled off from graphite using an adhesive tape, and the like. Although high-quality graphene required for basic studies may be obtained, it is difficult to commercialize the method because the yield is very low, and furthermore, it is difficult to obtain a graphene sheet with a large area (Science, 2004, 306, 666).

2) Exfoliation Using Solvent

This is a method of peeling off a graphene sheet from graphite by using an appropriate solvent without a particular intercalant or a manipulation such as oxidation-reduction. When a solvent system having a solvent-graphene interfacial interaction energy higher than the graphene-graphene interfacial interaction energy is used, a graphene-dispersion solution may be obtained (Nat. Nanotechnol. 2008, 3, 563).

3) Thermal Expansion/Intercalation

Expandable graphite may be heated to 1,000° C. to make a graphite flake composed of a plurality of layers, molecules such as oleum (f-sulfuric acid/$SO_3$) and tetrabutyl ammonium hydroxide may be sandwiched between graphene layers, and the resulting flake may be put into a solution including 1,2-distearoyl-sn-glycero-3-phosphoethanolamine-N-[methoxy(polyethyleneglycol)-5000] (DSPE-mPEG) and ultrasonically treated to prepare a graphene-dispersion solution (Nat. Nanotechnol. 2008, 3, 538).

4) Oxidation/Reduction of Graphite

Graphene is oxidized to prepare graphite oxide, and the graphite oxide is exfoliated, and then is reduced to prepare graphene. Double bonds in the graphite oxide compete with oxygen and the graphite oxide usually becomes an epitaxial form, and edges thereof are allowed to have various functional groups including hydroxyl, carboxyl, and other carbonyl groups. The graphite oxide is easily exfoliated through an ultrasonic treatment, and reduced by a reducing agent such as hydrazine to obtain graphene. This is a method of obtaining graphene by oxidizing graphite to become dispersed, and then reducing the graphite, and the method enables graphite to be relatively mass-produced, and thus has been currently used in many cases. However, there is a disadvantage in that oxygen atoms are not completely removed during the reduction process.

2. Epitaxial Growth

This is a method of deposition/growth on various metals or metal-carbides (Si—C, Ru—C, Ni—C, and the like), and the like. The Si—C crystal thermal decomposition method is based on a principle in which when Si—C single crystals are heated, SiC on the surface is decomposed to remove Si, and a graphene layer is produced by the remaining carbon atoms. At this time, methane and hydrogen gas and the like are used at high temperature. This is a method which is not suitable for mass production because high vacuum and high temperature are required when graphene is prepared, and the unit cost of preparation is high.

3. Organic Synthesis Method

This is a growth method through synthesis from low-molecular weight organic compounds. In the aryl-aryl carbon atom bonding reactions hitherto developed, a catalyst such as palladium is used (J. Am. Chem. Soc., 2008, 130, 4216). The preparation of graphene-type compounds by a preparation method using the organic synthesis is still globally in its early stages, but there is a limitation in synthesizing graphene with a large capacity and a large area because the polymerization reaction conditions are demanding and the polymerization also has a very low success rate.

4. CVD Method

The CVD method is a method of obtaining graphene formed on a thin metal film prepared by depositing a catalyst metal on a substrate, flowing a gas including carbon along with argon and hydrogen thereon at a high temperature of 800° C. or more, and cooling the film. However, there is a disadvantage in that the process temperature is very high, graphene may be damaged during the process of removing the catalyst, and the method is adverse in terms of large area and price.

5. Method Using Graphite Intercalation Compound

The method using a graphite intercalation compound is to intercalate a metal into the interlayer region of graphite. The original interlayer interval of graphite is 3.35 Å, but when alkali metal or alkaline earth metal ions are intercalated into the interlayer region of graphite, the interlayer interval thereof is increased. At this time, as ions located in the lower part of the periodic table, that is, ions with a larger atomic radius are intercalated, the interval thereof is further increased. Since the alkali metals and alkaline earth metals are elements corresponding to Groups I and II of the periodic table and are very reactive, it is impossible to perform the process under the oxygen atmosphere. In addition, there is a disadvantage in that the unit price of graphene is significantly increased since the price of the metal itself is also very high.

Therefore, there is a continuous need for a simple and safe method for obtaining graphene with a large area at a high yield, which is the most strongly highlighted material for a carbon-based electric device or a carbon-based electromagnetic device while overcoming the shortcomings of the conventional method.

SUMMARY OF THE DISCLOSURE

Therefore, an aspect of the detailed description is to provide a method for preparing graphene using a spontaneous process, which prepares high-quality graphene with a large area at a high yield without any supply of energy from the outside as a simple and safe method because an electrolyte for a lithium ion battery, water (or alcohol), graphite, and lithium are used.

To achieve these and other advantages and in accordance with the purpose of this specification, as embodied and broadly described herein, a method for preparing graphene using a spontaneous process according to an exemplary embodiment of the present invention includes: disposing lithium metal into surface contact with graphite; immersing the surface contacted lithium metal and graphite in an electrolyte for a lithium ion battery to form a graphite intercalation compound; and introducing the graphite intercalation compound into water or alcohol to form graphene while generating hydrogen gas.

Step (1) may further include disposing a second metal into surface contact with the graphite, the second metal may be selected from the group consisting of copper (Cu), silver (Ag), gold (Au), platinum (Pt), and the combinations thereof, and the lithium metal and the second metal may be in surface contact with each other while graphite is interposed therebetween.

Step (2) may be spontaneously performed by a potential difference due to a fixed surface contact between the lithium metal and the graphite.

Step (2) may be accelerated by an increase in potential difference due to a fixed surface contact of the lithium metal and the second metal, which interpose graphite therebetween.

The lithium metal may be in the form of a foil.

The second metal may be in the form of a foil.

The graphite intercalation compound may be $Li_xC_y$, where $0<x\leq1$ and $y=6$.

The graphite may be selected from the group consisting of artificial graphite, natural graphite, and the combinations thereof.

The graphite may be selected from the group consisting of a powder form, a granule form, a rod form, a fiber form graphite, and the combinations thereof.

The electrolyte for a lithium ion battery may be selected from the group consisting of an ethylene carbonate solution in which a lithium salt is dissolved, a dimethyl carbonate solution in which a lithium salt is dissolved, a diethyl carbonate solution in which a lithium salt is dissolved, an ethyl methyl carbonate solution in which a lithium salt is dissolved, a propylene carbonate solution in which a lithium salt is dissolved, and the combinations thereof.

The lithium salt may be selected from the group consisting of $LiPF_6$, $LiClO_4$, $LiCF_3SO_3$, $LiBF_4$, $LiAsF_6$, $LiC_2F_6NO_4S_2$, $LiB(C_2O_4)_2$, $LiH_2PO_4$, $LiAlCl_4$, $LiGaCl_4$, and the combinations thereof.

The electrolyte for a lithium ion battery may further include one selected from the group consisting of methyl acetate (MA), methyl propionate (MP), ethyl acetate (EA), ethyl propionate (EP), and the combinations thereof.

Step (1) may include applying graphite on a lithium foil to compress the lithium foil or to roll the lithium foil into a round shape or to bend the lithium foil so as to form an angle.

Step (1) may include compressing a structure formed by placing a second metal foil on the lithium foil on which graphite is applied, or rolling the structure into a round shape or bending the structure so as to form an angle.

Step (2) may be performed for 1 minute to 48 hours.

Step (3) may be performed for 1 second to 12 hours.

Step (3) may further include filtering and washing the graphene formed, and the filtering may be performed by using a centrifugal method or a vacuum filter.

The vacuum filter may have a pore size of 0.01 to 0.1 um.

The method for preparing graphene using a spontaneous process may further include: dispersing the graphene formed in step (3) into a dispersive solvent; and drying the dispersed graphene to form a graphene powder.

The dispersive solvent may be selected from the group consisting of N-methyl-2-pyrrolidone (NMP), dimethylformamide (DMF), dimethylacetamide (DMAc), dimethyl sulfoxide (DMSO), and the combinations thereof.

Hereinafter, the present invention will be described in more detail.

In an exemplary embodiment, the present invention provides a method for preparing graphene using a spontaneous process, the method including: disposing lithium metal into surface contact with graphite; immersing the surface contacted lithium metal and graphite in an electrolyte for a lithium ion battery to form a graphite intercalation compound; and introducing the graphite intercalation compound into water or alcohol to form graphene while generating hydrogen gas. The method is to mass-produce high-quality graphene composed of a single layer or several layers by using a lithium intercalation phenomenon of a graphite electrode occurring during the process of charging a lithium ion battery and a lithium ion capacitor in the preparation of graphene to prepare a graphite intercalation compound, and performing exfoliation through a reaction with water (or alcohol). As described above, the method of the present invention is a process in which no additional energy is required due to the use of a spontaneous process, and a method for preparing high-purity graphene with a large area in a very short time as a simple process compared to existing graphene preparation methods, which is based on a pure physical exfoliation as a non-oxidation process. Due to these characteristics, the graphene preparation method of the present invention is a high-yield process with a theoretical yield of 100%.

In a specific exemplary embodiment, the lithium metal used in the graphene preparation method of the present invention may be a lithium foil. The lithium metal in the form of a foil may be desirable in that from the viewpoint of surface contact with graphite, the foil is physically convenient and secures a fixed and predetermined potential difference more easily. Further, the foil may also be desirable in that the foil is a material which is much safer than the lithium powder in the form of a powder, and may be reused.

In order to apply a graphene material having excellent properties to electronic devices, the graphene material may be price-competitive and commercially available only when high-quality graphene with a large area may be mass-produced and graphene may be prepared at low temperatures such as a normal temperature range. From the viewpoint, the graphene preparation method of the present invention is an excellent method which is not only price-competitive, and but also very suitable for mass-production of high-purity graphene with a large area at a theoretical yield of 100% without any loss of area due to simple processes through pure physical exfoliation because no additional energy is required due to the use of a spontaneous process, and accordingly, the process may be performed at normal temperature. As a result, the resulting graphene may be applied to energy storage/conversion devices such as a (lithium) battery, a (lithium) capacitor, and a fuel cell, which have high capacity, high efficiency, and long-term cycle characteristics, and a polymer actuator which has a high energy efficiency and a high displacement and yields a powerful strength, and various functional structures.

Hereinafter, in specific exemplary embodiments, the preparation method of the graphene according to the present invention will be described with reference to the schematic views of FIGS. 1, 2, and 3.

According to FIG. 1, graphite 110 may be placed on a lithium foil 120. Surface contact is achieved by using a lithium metal in the form of a foil, and a spontaneous lithium intercalation may be achieved only when a predetermined potential difference is maintained between graphite and lithium metal throughout the reaction through the surface contact. Due to the aforementioned surface contact, the present invention may provide a graphene preparation method, which enables graphene to be prepared spontaneously without any need for adding additional energy such as heat, pressure, electric energy or ultrasonic waves. As a result, the forming of the graphite intercalation compound may be spontaneously performed by a potential difference due to a fixed surface contact between the lithium metal and the graphite.

In a specific exemplary embodiment, thereafter, a lithium foil on which graphite is applied may be compressed, or rolled into a round shape or bent so as to form an angle. The graphite may be artificial graphite, natural graphite, or the combination thereof, but is not limited thereto. Further, the graphite may be a powder form, a granule form, a rod form, a fiber form graphite, or the combinations thereof, but is not limited thereto.

According to FIG. 2, the graphite-applied lithium foil, which is compressed, rolled into a round shape, or bent so as to form an angle, may be introduced into a reactor 210 including an electrolyte 220 for a lithium ion battery. At this time, lithium ions are generated from the lithium foil by a potential difference between the surface-contacted lithium foil 120 and graphite 120, which are formed in the electrolyte 220, the lithium ions thus generated and a solvent begin to be co-intercalated into the interlayer region of graphite, and as time passes, most of the graphite 110 is converted into a graphite intercalation compound 110a, exhibiting a gold color tone. The graphite intercalation compound may be expressed as $Li_xC_y$, where $0<x\leq1$ and $y=6$.

In a specific exemplary embodiment, the forming of the graphite intercalation compound may be performed for 1 minute to 48 hours. Preferably, the forming of the graphite intercalation compound may be performed for 30 minutes to 1 hour, and in this case, there is an advantage in that lithium and solvent molecules are sufficiently co-intercalated into the interlayer region of graphite, and the process delay and decomposition of the electrolyte for a lithium ion battery may be prevented.

In a specific exemplary embodiment, the electrolyte which may be used in the forming of the graphite intercalation compound may be an electrolyte for a lithium ion battery, which may be co-intercalated along with lithium ions. An electrolyte for a lithium ion batter, which is known in the related art, may be used, and examples thereof include an ethylene carbonate solution in which a lithium salt is dissolved, a dimethyl carbonate solution in which a lithium salt is dissolved, a diethyl carbonate solution in which a lithium salt is dissolved, an ethyl methyl carbonate solution in which a lithium salt is dissolved, a propylene carbonate solution in which a lithium salt is dissolved, and the combinations thereof, but are not limited thereto. Furthermore, the lithium salt may be $LiPF_6$, $LiClO_4$, $LiCF_3SO_3$, $LiBF_4$, $LiAsF_6$, $LiC_2F_6NO_4S_2$, $LiB(C_2O_4)_2$, $LiH_2PO_4$, $LiAlCl_4$, $LiGaCl_4$, or the combinations thereof, but are not limited thereto. Further, the electrolyte for a lithium ion battery may further include one or more electrolytes, and examples thereof include methyl acetate (MA), methyl propionate (MP), ethyl acetate (EA), ethyl propionate (EP), or the combinations thereof, but are not limited thereto. In the graphene preparation method of the present invention, the electrolyte is advantageous in that the electrolyte may be reused.

The graphite intercalation compound 110a produced through the process may be taken out from the reactor filled with the electrolyte, and then the lithium foil may be stretched out to scrub the graphite intercalation compound 110a, or the electrolyte 220 may be sprayed on the lithium foil 120 to collect the graphite intercalation compound 110a.

Referring to FIG. 3, a solution 220a collected while washing the graphite intercalation compound 110a adhered on the surface of the lithium foil 120 are shown. Accordingly, the graphite intercalation compound 110a is mixed with the solution 220a. When the solution 220a is mixed with water or alcohol 320 while stirring, the water or alcohol 320 may be reacted with lithium intercalated in the graphite intercalation compound 110a to remove lithium from the graphite intercalation compound 110a, and hydrogen gas simultaneously generated may exfoliate graphene 310 from the graphite intercalation compound 110a. The forming of the graphene may be performed for 1 second to 12 hours. Preferably, the forming of the graphene may be performed for 5 minutes to 1 hour, and in this case, it is possible to sufficiently exfoliate graphene from the graphite intercalation compound while securing an appropriate process time without any delay. The process in which graphene 310 is exfoliated from the graphite intercalation compound 110a may be confirmed from a change in color of the solution from the gold color to the gray color.

In a specific exemplary embodiment, since the graphene 310 obtained by the aforementioned process includes the electrolyte and deionized water, the electrolyte and deionized water should be removed. Therefore, the forming of the graphene may further include primarily filtering and washing the graphene formed with deionized water, and then secondarily filtering and washing the graphene by using a dispersive solvent such as ethanol, and the filtering may be performed by using a centrifuge or a vacuum filter. When a vacuum filter is used, the vacuum filter may have a pore size of 0.01 to 0.1 um. Preferably, the vacuum filter may have a pore size of 0.02 um to 0.05 um, and in this case, since graphene with a small size is not lost, the filtration time may be prevented from being excessively increased while graphene with a significant size is obtained.

As described above, the graphene 310 may be primarily washed with deionized water by using a centrifugal or vacuum filter apparatus, and then may be further washed sufficiently with ethanol. After washing with ethanol, the graphene 310 remaining on the filter may be put into ethanol while not being removed from the filter, and a ultrasonic cleaner may be used to separate graphene 310 from the filter. Subsequently, when the filter is removed from the ethanol solution, a graphene solution dispersed in ethanol is obtained. At this time, the dispersive solvent may be not only the aforementioned ethanol, but also any solvent in which graphene is easily dispersed, a solvent mixture, a dispersion stabilizer, or the combination thereof. Such steps may refer to substitution of the graphene solvent, and may be performed by vacuum filtering and washing steps as described above.

Graphene has a very large surface area, and thus strongly tends to be aggregated by Van der Waals forces. Accordingly, the exfoliated graphene sheet should be suppressed from being restacked through dispersion into dispersive solvent. Therefore, in a specific exemplary embodiment, the graphene preparation method of the present invention may further include: dispersing the graphene formed in the forming of the graphene in a dispersive solvent; and drying the dispersed graphene to form a graphene powder. The dispersive solvent may be N-methyl-2-pyrrolidone (NMP), dimethylformamide (DMF), dimethylacetamide (DMAc), dimethyl sulfoxide (DMSO), or the combinations thereof, but is not limited thereto. Preferably, the dispersive solvent may be NMP.

Therefore, in a specific exemplary embodiment, the graphene dispersed in ethanol may be filtered in a vacuum filter apparatus, and then sufficiently washed with ethanol and dried at 60° C. in a vacuum dryer, thereby preparing a graphene powder. Thereafter, the dried powder may be put into N-methyl-2-pyrrolidone (NMP) and dispersed through ultrasonic treatment, and then dried, thereby obtaining a final graphene powder.

FIG. 4 illustrates a phenomenon occurring when graphite is in surface contact with a lithium foil in an electrolyte for a lithium ion battery, and when both the graphite and the lithium foil are in surface contact with each other, lithium atoms are spontaneously dissociated into lithium ions by a potential difference formed between lithium and graphite and constantly maintained during the reaction and may be intercalated along with the electrolyte into the interlayer region of graphite.

As described above, a schematic view in which lithium is intercalated between the layers of graphite may be seen in FIG. 5.

FIG. 6 is an in-situ SAXS analysis result in which graphite and lithium are brought into surface contact with each other and introduced into an electrolyte, and then a varying distance between the layers for 1 hour is expressed as the q value. From the analysis result of FIG. 6, it can be confirmed that the distance between the layers of graphite is increased by about 0.2□ after 1 hour is passed, that is, most of the graphite is converted into the graphite intercalation compound after 1 hour.

Through an electron diffraction analysis, it can be confirmed whether the resulting graphene is non-oxidized graphene. Generally, only in the case of non-oxidized graphene, a hexagonal pattern appears during the electron diffraction analysis, and it can be confirmed that the graphene prepared according to the method of the present invention shows a hexagonal pattern as confirmed from FIG. 7, and thus is non-oxidized graphene.

From the Raman spectroscopy result of FIG. 8, it can be seen that the D/G peak ratio of the graphene prepared by the method of the present invention is 0.55. Generally, when the D/G peak ratio is 1 or less, the graphene is known to be high-quality graphene with less defect or impurity. Accordingly, it can be seen that the graphene prepared by the method of the present invention is very low in defect or impurity.

FIG. 9 is a TEM photograph of the graphene prepared in Example 1 of the present invention, FIG. 10a is an AFM photograph of the graphene prepared in Example 1 of the present invention, and FIG. 10b is a graph illustrating the thickness thereof. These drawings show that the graphene preparation method provided in the present invention may form high-quality graphene with a large area.

In a specific exemplary embodiment, the disposing of the lithium metal into surface contact with graphite may further include disposing a second metal into surface contact with the graphite, the second metal may be selected from the group consisting of copper (Cu), silver (Ag), gold (Au), platinum (Pt), and the combinations thereof, and the lithium metal and the second metal may be in surface contact with each other while graphite is interposed therebetween. In addition, the forming of the graphite intercalation compound may be accelerated by an increased potential difference caused due to a fixed surface contact of the lithium metal and the second metal, which interpose graphite therebetween. The second metal may also be in the form of a foil as in the lithium metal. The disposing of the second metal with graphite may include compressing a structure formed by placing a second metal foil on the lithium foil on which graphite is applied, rolling the structure into a round shape, or bending the structure so as to form an angle.

Accordingly, in a specific exemplary embodiment, the graphene preparation method of the present invention may include disposing graphite into surface contact with the lithium foil and one metal foil selected from the group while facing each other, and in this case, a potential difference between the different metals is larger than that of the case where a lithium foil is used alone, and it is possible to increase a rate at which lithium and solvent molecules are co-intercalated into the interlayer region of graphite.

The present invention relates to a method for preparing graphene by using an intercalation reaction of lithium ions produced by the surface contact of graphite and lithium to make a graphite intercalation compound, and performing physical exfoliation through a reaction with water (or alcohol).

The present invention has an effect of providing a graphite intercalation compound and graphene as a simple process without any supply of energy from the outside by using a spontaneous intercalation reaction by surface contact of lithium and graphite in an electrolyte. That is, the graphene preparation method according to the present invention is a spontaneous process which does not require supply of energy from the outside, such as heat, pressure, electricity, and ultrasonic waves, and it is possible to prepare high-quality graphene without any need for an acid treatment process. Since acid is not used in the graphene preparation method of the present invention, high-quality graphene with less defect may be obtained. Lithium intercalated in a trace amount in the graphite intercalation compound is stable against air or moisture during the exfoliation process, and thus is less hazardous than other metals. Furthermore, since lithium is completely intercalated into the interlayer region of graphite in a short time, the method is a high-yield process which may convert the total amount of graphite introduced into graphene, and the electrolyte and lithium may be recycled. For this reason, the time and costs for preparing graphene may be significantly decreased, and it is possible to mass-produce graphene.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
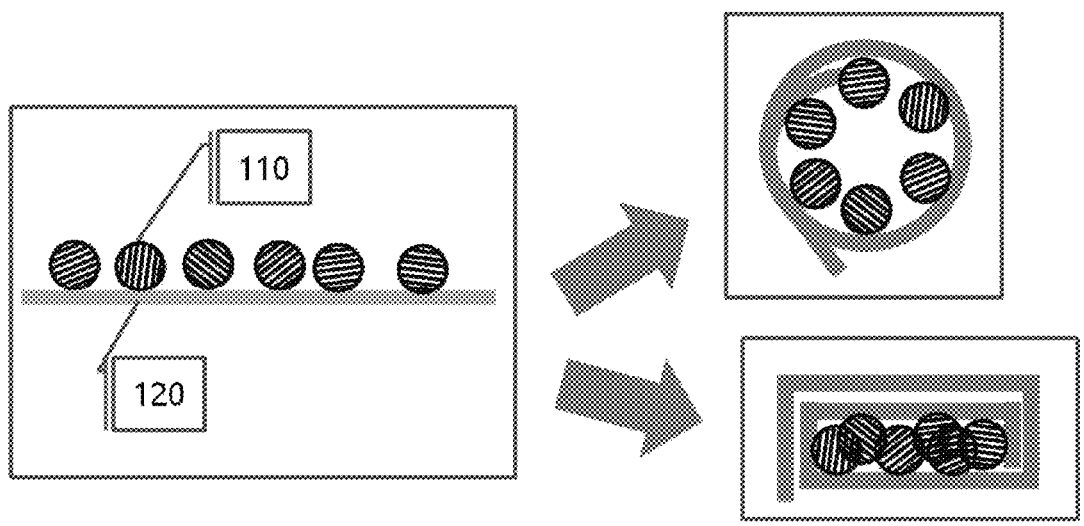
FIG. 1 is a schematic view illustrating a method for disposing a lithium foil in surface contact with graphite.
Figure 2:
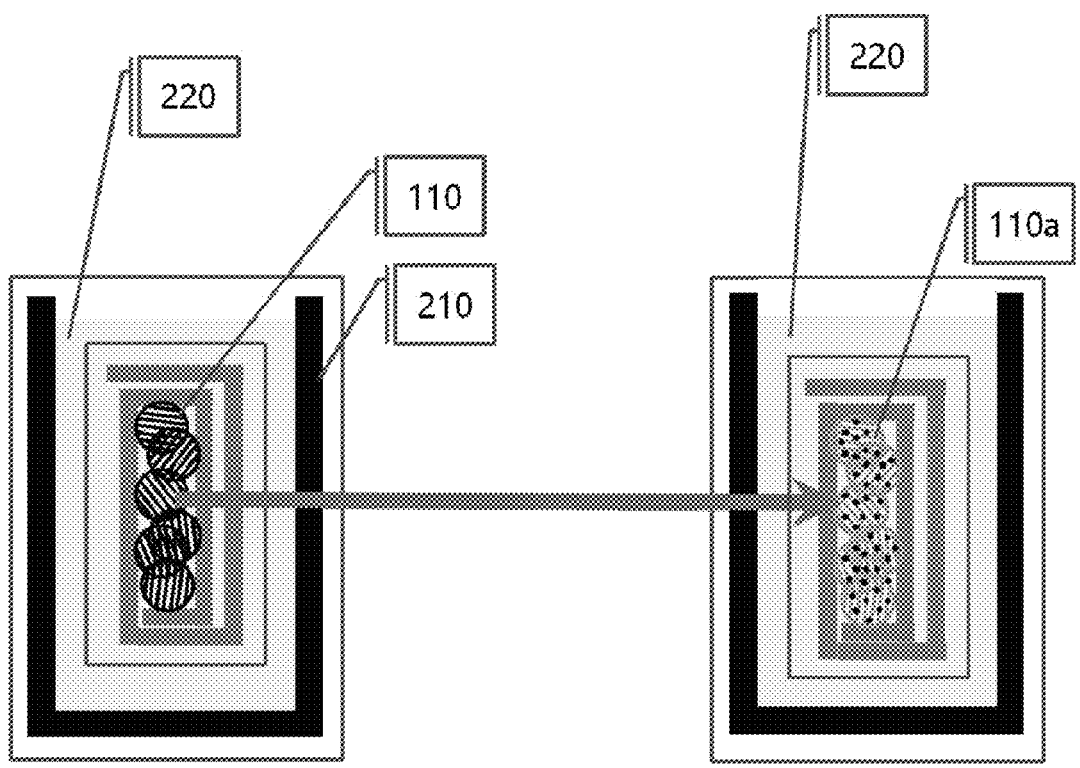
FIG. 2 is a schematic view illustrating a process of immersing graphite surrounded with a lithium foil prepared by the method of FIG. 1 in an electrolyte, and a process in which lithium and the electrolyte are co-intercalated into the interlayer region of graphite to form a graphite intercalation compound ($LiC_6$).
Figure 3:
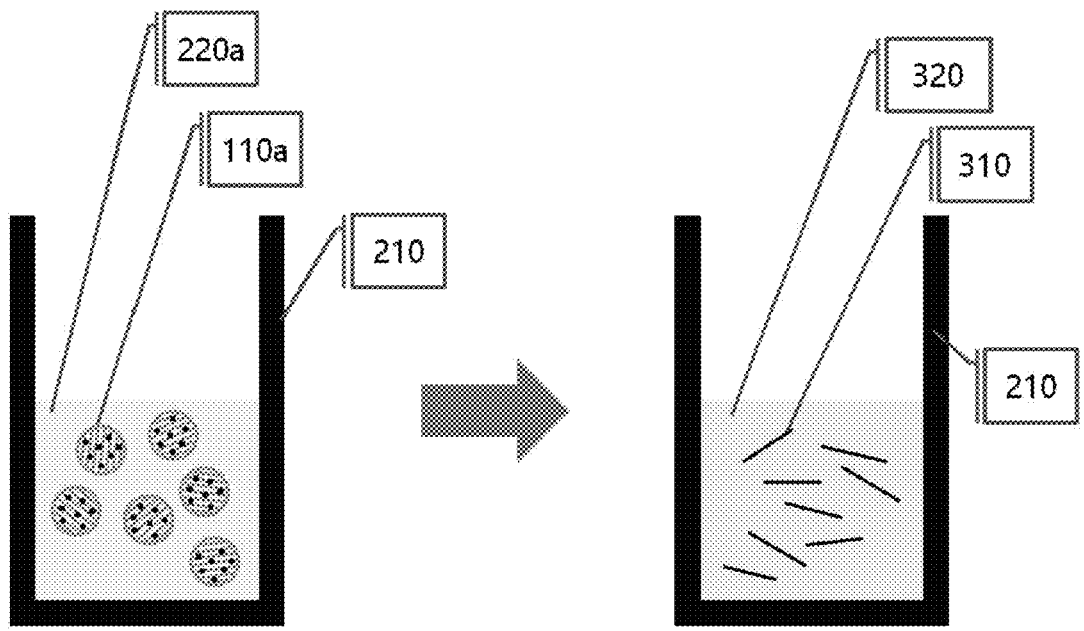
FIG. 3 is a schematic view representing a method of obtaining graphene by separating the graphite intercalation compound formed by the method of FIG. 2 from the lithium foil to collect the graphite intercalation compound and putting the same into water (or alcohol) to exfoliate the graphite layer.
Figure 4:
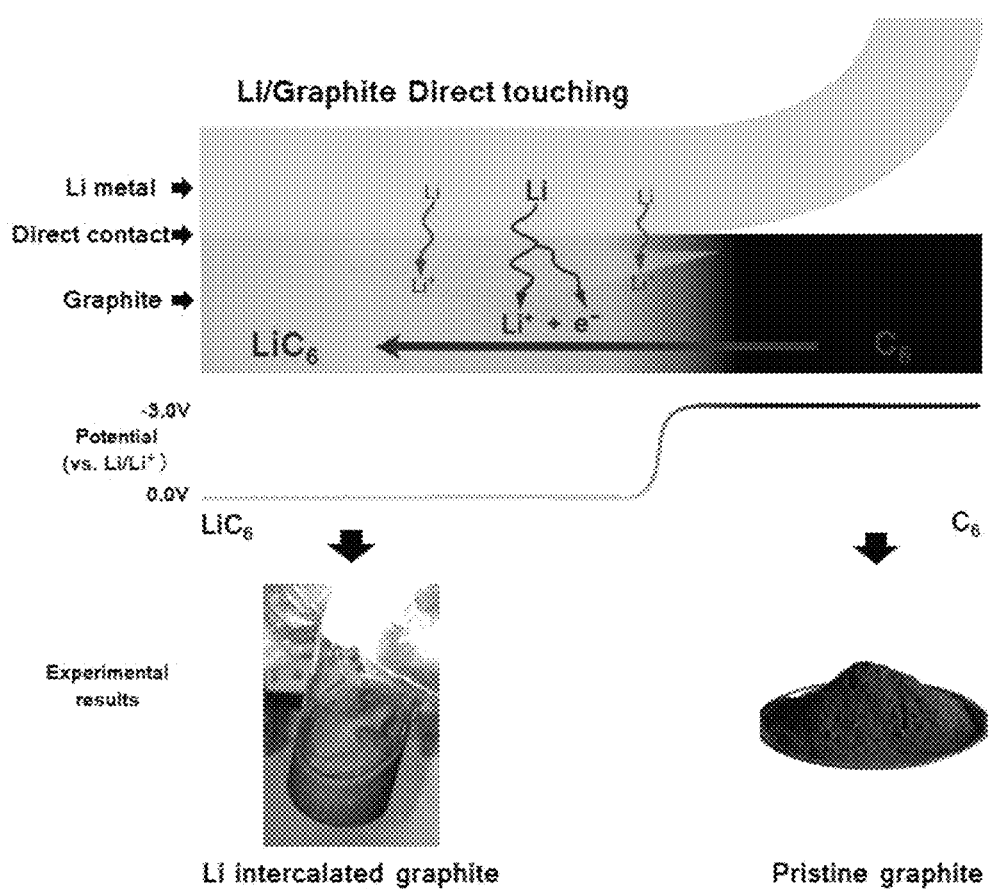
FIG. 4 is a schematic view illustrating a process in which the graphite intercalation compound is formed from graphite.
Figure 5:
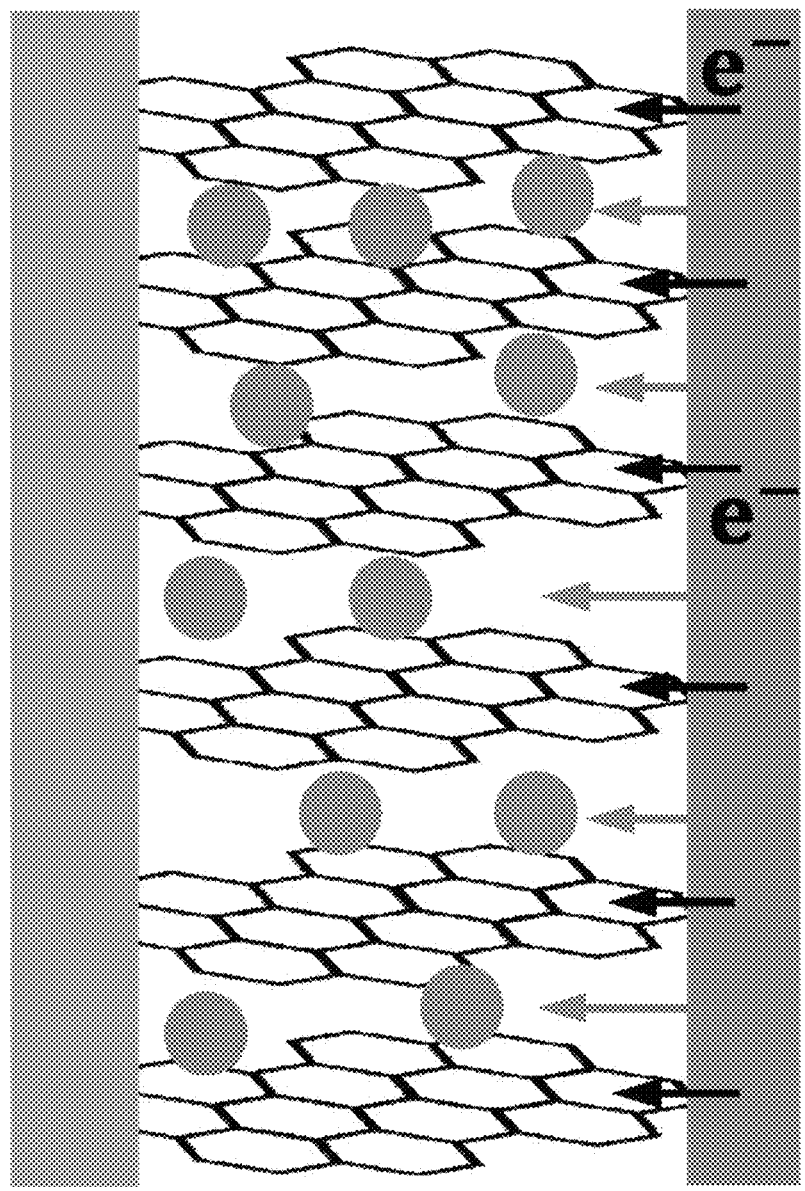
FIG. 5 is a schematic view representing a phenomenon in which lithium and the electrolyte are co-intercalated into the interlayer region of graphite by surface contact of graphite with the lithium foil.
Figure 6:
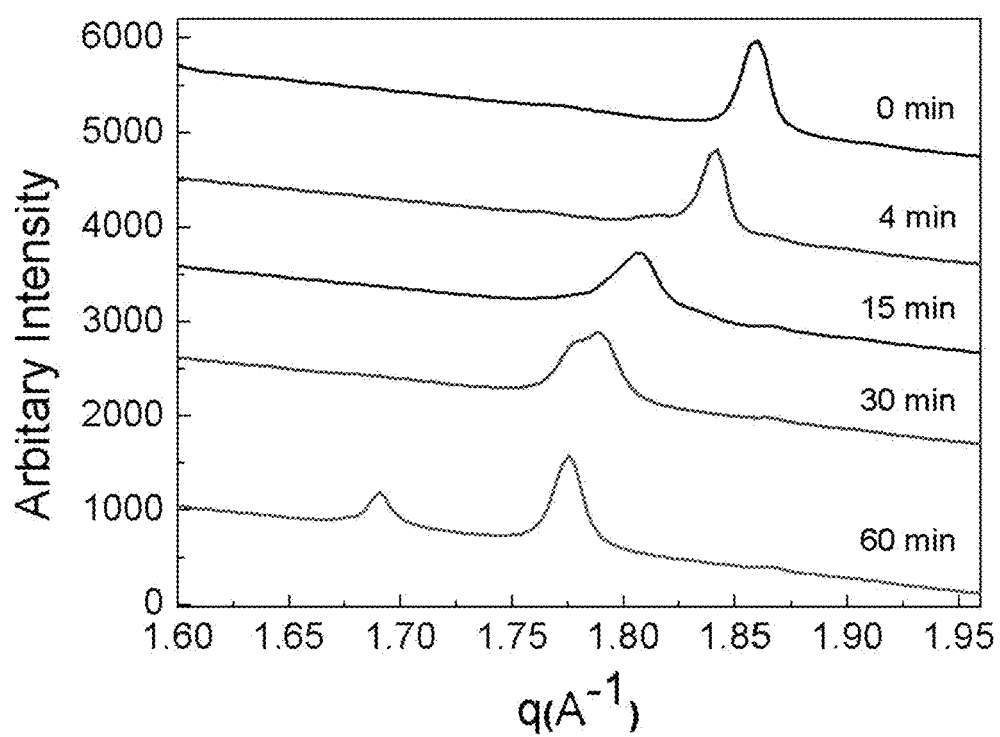
FIG. 6 is a small-angle X-ray scattering (SAXS) peak illustrating that lithium is intercalated into the interlayer region of graphite in Example 1 of the present invention over time.
Figure 7:
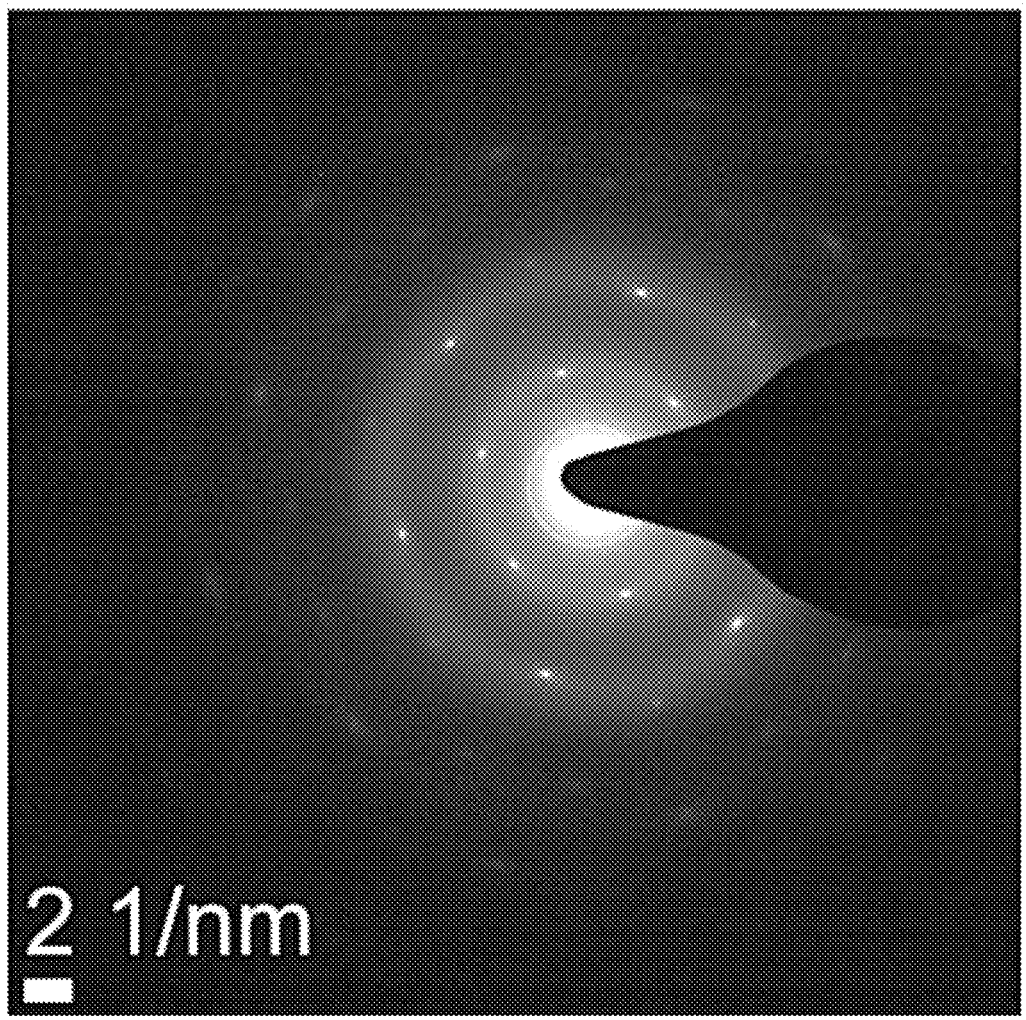
FIG. 7 is an electron diffraction pattern of the graphene prepared through Example 1 of the present invention.
Figure 8:
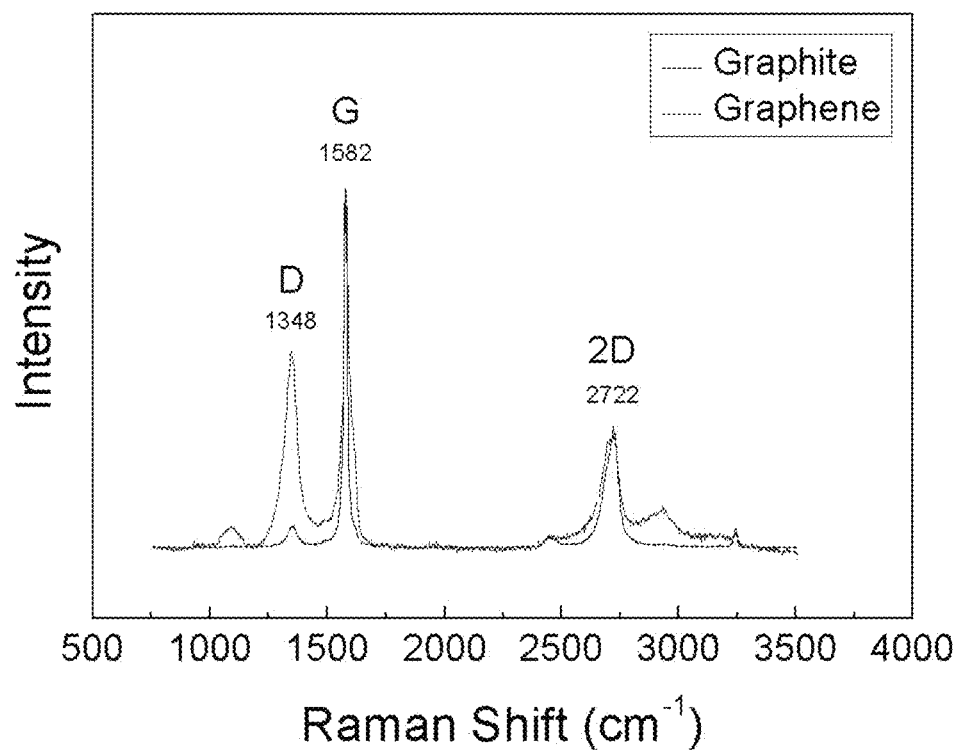
FIG. 8 is a Raman spectroscopy result of the graphene prepared through Example 1 of the present invention and graphite which is the material thereof.
Figure 9:
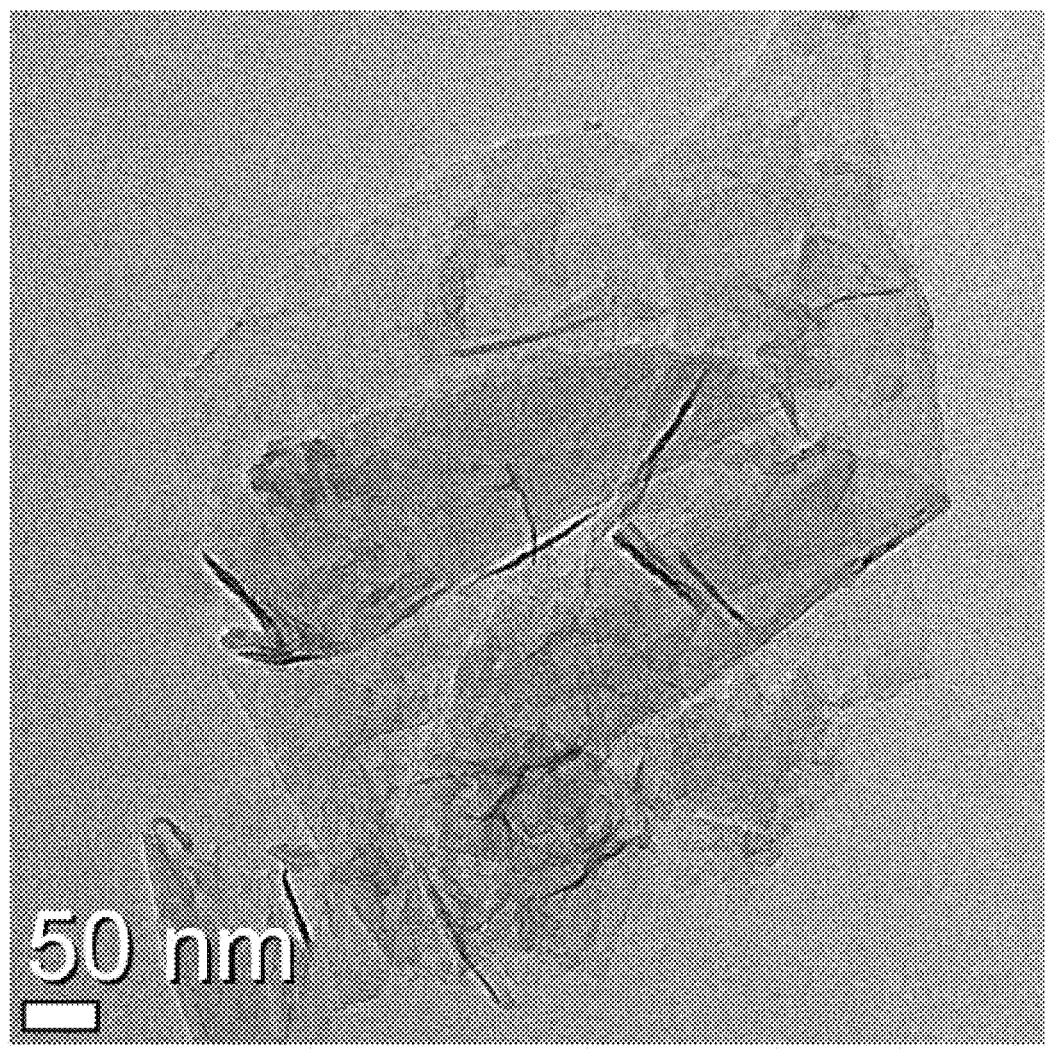
FIG. 9 is a high-magnification transmission electron microscope (TEM) of the graphene prepared through Example 1 of the present invention.
Figure 10A:
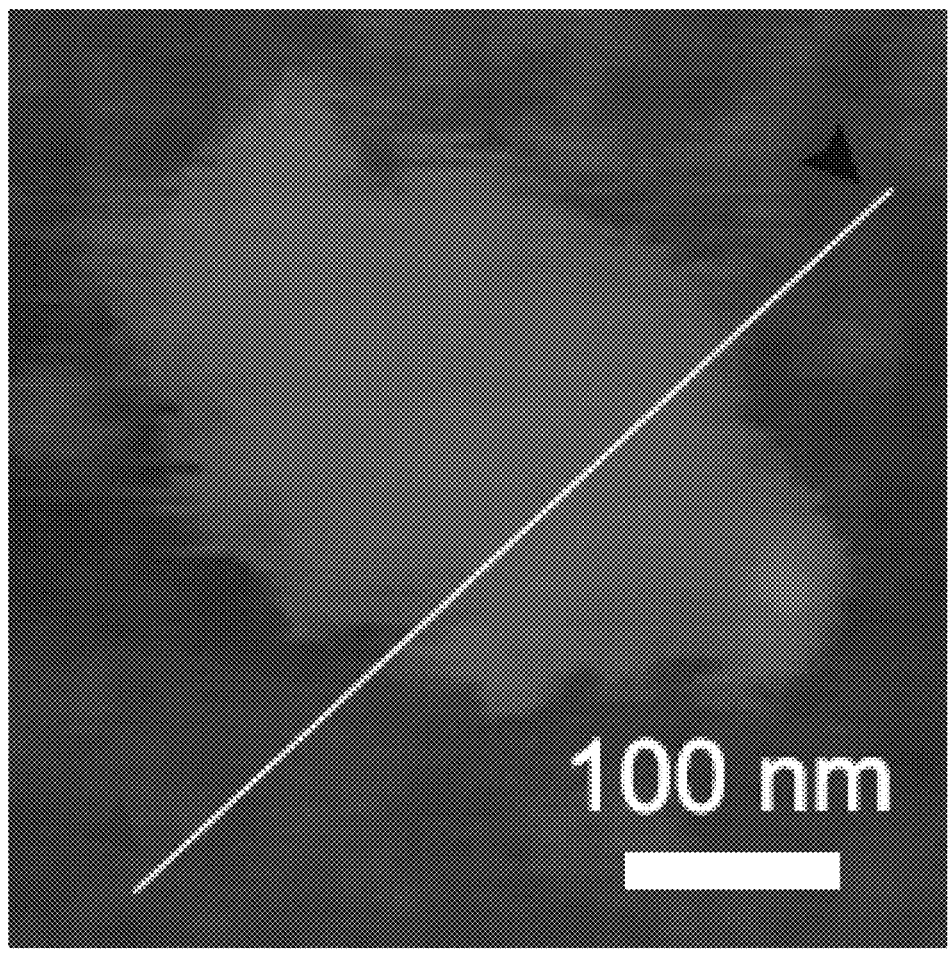
FIG. 10a is an atomic force microscope (AFM) of the graphene prepared through Example 1 of the present invention.
Figure 10B:
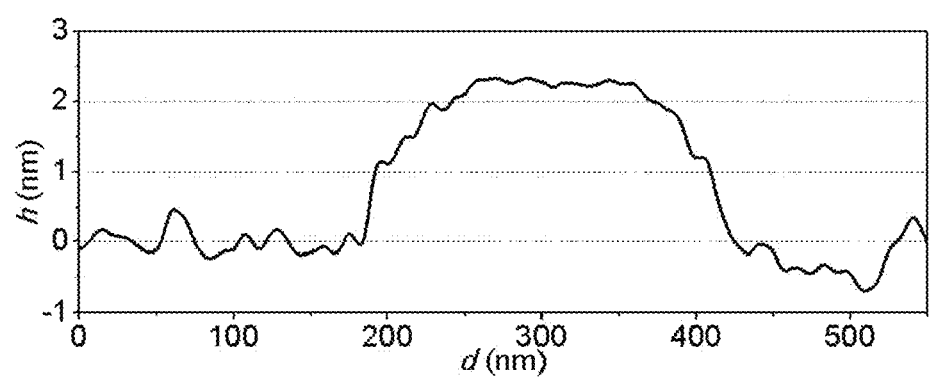
FIG. 10b is a graph showing a height of a graphene sheet prepared through Example 1 of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, exemplary embodiments of the present invention will be described in detail with reference to the accompanying drawings, such that those skilled in the art to which the present invention pertains can easily carry out the invention. However, the present invention can be implemented in various different forms, and is not limited to the exemplary embodiments described herein. Therefore, it is to be understood that the following Examples are only for the purpose of illustrating the present invention, and the scope of the present invention is not interpreted to be limited by these Examples.

Example 1

An artificial graphite (Lot No.: 282863, Particle size: <20 µm, Aldrich) as a graphite, a lithium foil (Hohsen Corp. Japan) as a source for ions to be intercalated into the interlayer region of graphite, and a mixed solvent (trade name: StarLyte, Panax Etec Co., Korea) of ethylene carbonate (EC)/diethyl carbonate (DEC) (EC:DEC=3:7, v/v) in which 1 M of $LiPF_6$ was mixed as an electrolyte were used.

In a glove box under argon atmosphere, graphite was uniformly applied on the lithium foil, and graphite was brought into surface contact with the lithium metal by rolling the lithium foil so as to form an angle. Then, the lump of graphite and lithium was put into the electrolyte, and was left to stand for 30 minutes. Thereafter, the lump of graphite and lithium was taken out from the electrolyte and stretched out, graphite (graphite intercalation compound) co-intercalated by lithium and solvent molecules was collected and placed into a vial, and the vial was sealed, and then taken out from the glove box.

Immediately after the vial taken out from the glove box was opened, the graphite intercalation compound was taken out and placed into a reactor containing water, and the resulting mixture was stirred for 1 minute. The stirred solution (a graphene solution dispersed in water) was filtered in a vacuum filter apparatus equipped with a filter (trade name: Anodisc, Whatman) having a pore size of 0.02 µm, washed with water, and then sufficiently washed with ethanol.

The washed graphene was placed into a beaker containing ethanol without being removed from the filter, graphene was separated from the filter by using a ultrasonic cleaner, and then the filter was removed from the ethanol solution to obtain a graphene solution dispersed in ethanol.

In order to prepare a graphene powder, the graphene solution dispersed in ethanol was filtered in the vacuum filter apparatus equipped with a filter having a pore size of 0.02 µm, washed sufficiently with ethanol, and then dried at 60° C. in a vacuum dryer. Thereafter, the dried powder was put into an NMP (Sigma-Aldrich), dispersed through a ultrasonic treatment, and dried to prepare a graphene powder.

Example 2

An artificial graphite (Lot No.: 282863, Particle size: <20 µm, Aldrich) as a graphite, a lithium foil as a source for ions to be intercalated into the interlayer region of graphite, and a mixed solvent of ethylene carbonate (EC)/diethyl carbonate (DEC) (EC:DEC=3:7, v/v) in which 1 M of $LiPF_6$ was mixed as an electrolyte were used.

In a glove box under argon atmosphere, graphite was uniformly applied on the lithium foil, and graphite was brought into surface contact with lithium by rolling the lithium into a round shape. Then, the lump of graphite and lithium was put into the electrolyte, and was left to stand for 6 minutes. Thereafter, the lump of graphite and lithium was taken out from the electrolyte and stretched out, graphite (graphite intercalation compound) co-intercalated by lithium and solvent molecules was collected and placed into a vial, and the vial was sealed, and then taken out from the glove box.

Immediately after the vial taken out from the glove box was opened, the graphite intercalation compound was taken out and placed into a reactor containing water, and the resulting mixture was stirred for 30 minutes. The stirred solution (a graphene solution dispersed in water) was filtered in a vacuum filter apparatus equipped with a filter having a pore size of 0.02 µm, washed with water, and then sufficiently washed with ethanol.

The washed graphene was placed into a beaker containing ethanol without being removed from the filter, graphene was separated from the filter by using a ultrasonic cleaner, and then the filter was removed from the ethanol solution to obtain a graphene solution dispersed in ethanol.

In order to prepare a graphene powder, the graphene solution dispersed in ethanol was filtered in the vacuum filter apparatus equipped with a filter having a pore size of 0.02 µm, washed sufficiently with ethanol, and then dried at 60° C. in a vacuum dryer. Thereafter, the dried powder was put into an NMP, dispersed through a ultrasonic treatment, and dried to prepare a graphene powder.

Example 3

An artificial graphite (Lot No.: 282863, Particle size: <20 µm, Aldrich) as a graphite, a lithium foil as a source for ions to be intercalated into the interlayer region of graphite, and a mixed solvent of ethylene carbonate (EC)/diethyl carbonate (DEC) (EC:DEC=3:7, v/v) in which 1 M of $LiPF_6$ was mixed as an electrolyte were used.

In a glove box under argon atmosphere, graphite was uniformly applied on the lithium foil, and graphite was brought into surface contact with lithium by rolling the lithium so as to form an angle. Then, the lump of graphite and lithium was put into the electrolyte, and was left to stand for 12 minutes. Thereafter, the lump of graphite and lithium was taken out from the electrolyte and stretched out, graphite (graphite intercalation compound) co-intercalated by lithium and solvent molecules was collected and placed into a vial, and the vial was sealed, and then taken out from the glove box.

Immediately after the vial taken out from the glove box was opened, the graphite intercalation compound was taken out and placed into a reactor containing water, and the resulting mixture was stirred for 6 minutes. The stirred solution (a graphene solution dispersed in water) was filtered in a vacuum filter apparatus equipped with a filter having a pore size of 0.02 µm, washed with water, and then sufficiently washed with ethanol.

The washed graphene was placed into a beaker containing ethanol without being removed from the filter, graphene was separated from the filter by using a ultrasonic cleaner, and then the filter was removed from the ethanol solution to obtain a graphene solution dispersed in ethanol.

In order to prepare a graphene powder, the graphene solution dispersed in ethanol was filtered in the vacuum filter apparatus equipped with a filter having a pore size of 0.02 µm, washed sufficiently with ethanol, and then dried at 60° C. in a vacuum dryer. Thereafter, the dried powder was put into an NMP, dispersed through a ultrasonic treatment, and dried to prepare a graphene powder.

Example 4

An artificial graphite (Lot No.: 282863, Particle size: <20 µm, Aldrich) as a graphite, a lithium foil as a source for ions to be intercalated into the interlayer region of graphite, a platinum foil (Nilaco Corp., Japan) as a second metal to be in surface contact with graphite interposed therebetween on the opposite surface of the lithium foil, and a mixed solvent of ethylene carbonate (EC)/diethyl carbonate (DEC) (EC:DEC=3:7, v/v) in which 1 M of $LiPF_6$ was mixed as an electrolyte were used.

In a glove box under argon atmosphere, graphite was uniformly applied on the lithium foil, a platinum foil was placed thereon and then compressed to dispose graphite in surface contact with the lithium foil and the platinum foil. The graphite brought into contact with the lithium foil and the platinum foil was put into the electrolyte, and was left to stand for 10 minutes. Thereafter, the lump of graphite, lithium, and platinum was taken out from the electrolyte and stretched out, graphite (graphite intercalation compound) co-intercalated by lithium and solvent molecules was collected and placed into a vial, and the vial was sealed, and then taken out from the glove box.

Immediately after the vial taken out from the glove box was opened, the graphite intercalation compound was taken out and placed into a reactor containing water, and the resulting mixture was stirred for 1 minute. The stirred solution (a graphene solution dispersed in water) was filtered in a vacuum filter apparatus equipped with a filter having a pore size of 0.02 µm, washed with water, and then sufficiently washed with ethanol.

The washed graphene was placed into a beaker containing ethanol without being removed from the filter, graphene was separated from the filter by using a ultrasonic cleaner, and then the filter was removed from the ethanol solution to obtain a graphene solution dispersed in ethanol.

In order to prepare a graphene powder, the graphene solution dispersed in ethanol was filtered in the vacuum filter apparatus equipped with a filter having a pore size of 0.02 µm, washed sufficiently with ethanol, and then dried at 60° C. in a vacuum dryer. Thereafter, the dried powder was put into an NMP, dispersed through a ultrasonic treatment, and dried to prepare a graphene powder. When lithium was brought into surface with the second metal while interposing graphite therebetween, a higher potential difference was formed than that in the case where lithium was brought alone into surface contact, and thus the graphite intercalation compound is produced more rapidly.

Comparative Example

In the graphene preparation method, graphene was prepared by using lithium granules instead of a lithium foil in order to test whether the surface contact between the lithium metal and the graphite is a sufficient condition for performing a spontaneous process. The other process conditions were almost equal to those of Examples 1 to 3, except that the lithium foil was replaced with the lithium granule.

An artificial graphite (Lot No.: 282863, Particle size: <20 µm, Aldrich) as a graphite, a lithium granule (Lot No.: 499811, granular, Aldrich) as a source for ions to be intercalated into the interlayer region of graphite, and a mixed solvent of ethylene carbonate (EC)/diethyl carbonate (DEC) (EC:DEC=3:7, v/v) in which 1 M of $LiPF_6$ was mixed as an electrolyte were used.

In a glove box under argon atmosphere, graphite and lithium granules in excess were put into the electrolyte, and then the resulting mixture was vigorously stirred at normal temperature for 10 days. However, in the present step, a change in color of graphite (from the black color to the gold color), which was confirmed in Examples 1 to 3, was not observed. From the result, it was confirmed that in the present invention, co-intercalated graphite (graphite intercalation compound) by lithium and solvent molecules should be prepared while lithium in the form of a foil and graphite are in surface contact with each other, and the surface contact should be maintained while the reaction proceeds.

The foregoing description illustrates the present invention. Additionally, the above-described disclosure describes only the preferred exemplary embodiments of the present invention, and the present invention is capable of use in various other combinations, modifications, and environments. That is, the present invention is capable of changes or modifications within the scope of the inventive concept as expressed herein, commensurate with the above teachings, and/or the skill or knowledge of the relevant art. The exemplary embodiments described above are further intended to explain best modes known of practicing the invention and to enable others skilled in the art to utilize the invention in such, or other, embodiments and with the various modifications required by the specific applications or uses of the invention. Accordingly, the foregoing detailed description of the invention is not intended to limit the present invention to the form disclosed herein. Also, it is intended that the appended claims be construed to include alternative exemplary embodiments.

EXPLANATION OF REFERENCE NUMERALS AND SYMBOLS

110: Graphite
110a: Graphite intercalation compound into which lithium and electrolyte are intercalated
120: Lithium foil
210: Reactor
220: Electrolyte
220a: Solution in which 220 and 220a are mixed
310: Graphene
320: Water or alcohol The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for preparing graphene using a spontaneous process, the method comprising:
   (1) disposing lithium metal in surface contact with graphite and disposing a second metal in surface contact with the graphite,
   the second metal is selected from the group consisting of copper (Cu), silver (Ag), gold (Au), platinum (Pt), and the combinations thereof, and
   the lithium metal and the second metal are in surface contact with each other while the graphite is interposed therebetween;
   (2) immersing the surface contacted lithium metal and graphite in an electrolyte for a lithium ion batter to form bite intercalation compound; and
   (3) introducing the graphite intercalation compound into water or alcohol to form graphene while generating hydrogen gas.

2. The method of claim 1, wherein step (2) is spontaneously performed by virtue of a potential difference due to a fixed surface contact between the lithium metal and the graphite.

3. The method of claim 1, wherein step (2) is accelerated by virtue of an increased potential difference caused due to a fixed surface contact between the lithium metal and the second metal, wherein the graphite is interposed therebetween.

4. The method of claim 1, wherein the lithium metal is in a form of a foil.

5. The method of claim 1, wherein the second metal is in a form of a foil.

6. The method of claim 1, wherein the graphite intercalation compound is $Li_xC_y$, where $0<x\leq 1$ and $y=6$.

7. The method of claim 1, wherein the graphite is selected from the group consisting of artificial graphite, natural graphite, and the combinations thereof.

8. The method of claim 1, wherein the graphite is selected from the group consisting of a powder form, a granule form, a rod form, a fiber form graphite, and the combinations thereof.

9. The method of claim 1, wherein
the electrolyte for a lithium ion battery is selected from the group consisting of an ethylene carbonate solution in which a lithium salt is dissolved, a dimethyl carbonate solution in which a lithium salt is dissolved, a diethyl carbonate solution in which a lithium salt is dissolved, an ethyl methyl carbonate solution in which a lithium salt is dissolved, a propylene carbonate solution in which a lithium salt is dissolved, and the combinations thereof, and
the lithium salt is selected from the group consisting of $LiPF_6$, $LiClO_4$, $LiCF_3SO_3$, $LiBF_4$, $LiAsF_6$, $LiC_2F_6NO_4S_2$, $LiB(C_2O_4)_2$, $LiH_2PO_4$, $LiAlCl_4$, $LiGaCl_4$, and the combinations thereof.

10. The method of claim 9, wherein the electrolyte for a lithium ion battery further comprises one selected from the group consisting of methyl acetate (MA), methyl propionate (MP), ethyl acetate (EA), ethyl propionate (EP), and the combinations thereof.

11. The method of claim 1, wherein step (1) comprises applying graphite on a lithium foil to compress the lithium foil or to roll the lithium foil into a round shape or to bend the lithium foil so as to form an angle.

12. The method of claim 1, wherein step (1) comprises compressing a structure formed by placing a second metal foil on the lithium foil on which graphite is applied, or rolling the structure into a round shape or bending the structure so as to form an angle.

13. The method of claim 1, wherein step (2) is performed for 1 minute to 48 hours.

14. The method of claim 1, wherein step (3) is performed for 1 second to 12 hours.

15. The method of claim 1, wherein step (3) further comprises filtering and washing the graphene formed, and the filtering is performed by using a centrifuge or a vacuum filter.

16. The method of claim 15, wherein the vacuum filter has a pore size of 0.01 to 0.1 um.

17. The method of claim 1, further comprising:
(4) dispersing the graphene formed in step (3) into a dispersive solvent; and
(5) drying the dispersed graphene to form graphene powder.

18. The method of claim 17, wherein the dispersive solvent is selected from the group consisting of N-methyl-2-pyrrolidone (NMP), dimethylformamide (DMF), dimethylacetamide (DMAc), dimethyl sulfoxide (DMSO), and the combinations thereof.

19. A method for preparing graphene using a spontaneous process, the method comprising:
(1) disposing lithium metal in surface contact with graphite and disposing a second metal in surface contact with the graphite,
the second metal is selected from the group consisting of copper (Cu), silver (Ag), gold (Au), platinum (Pt), and the combinations thereof, and
the lithium metal and the second metal are in surface contact with each other while the graphite is interposed therebetween;
(2) immersing the surface contacted lithium metal and graphite in an electrolyte for a lithium ion battery to form a graphite intercalation compound; and
(3) introducing the graphite intercalation compound into water or alcohol to form graphene while generating hydrogen gas,
wherein step (2) is accelerated by virtue of an increased potential difference caused due to a fixed surface contact between the lithium metal and the second metal, wherein the graphite is interposed therebetween.

* * * * *